United States Patent [19]

Steinberger et al.

[11] Patent Number: 4,468,491

[45] Date of Patent: Aug. 28, 1984

[54] FORMULATIONS OF DEFOAMING AGENTS CONTAINING POLYSILOXANES AND POLYETHERS

[75] Inventors: Helmut Steinberger, Leverkusen; Heinrich Alberts, Cologne, both of Fed. Rep. of Germany

[73] Assignee: Bayer Aktiengesellschaft, Leverkusen, Fed. Rep. of Germany

[21] Appl. No.: 448,589

[22] Filed: Dec. 10, 1982

[30] Foreign Application Priority Data

Dec. 30, 1981 [DE]  Fed. Rep. of Germany ....... 3151957

[51] Int. Cl.³ .................. C08F 283/06; C08F 283/12; B01D 17/00
[52] U.S. Cl. .................................... 524/493; 252/321; 524/500; 524/504; 524/505; 525/404
[58] Field of Search ............... 524/500, 504, 505, 493; 525/404; 252/321

[56] References Cited

U.S. PATENT DOCUMENTS 3,478,075  11/1969  Jack et al. ............................ 525/404
4,368,290  1/1983  Alberts et al. ...................... 525/404

FOREIGN PATENT DOCUMENTS 29947  6/1981  European Pat. Off. ........... 525/404
53-34854  3/1978  Japan ................................. 525/505

Primary Examiner—Wilbert J. Briggs, Sr.
Attorney, Agent, or Firm—Sprung, Horn. Kramer & Woods

[57] ABSTRACT

A process for forming a polymer suitable for use in a defoaming agent, comprising polymerizing in the presence of a free-radical-forming catalyst a composition comprising by weight approximately 10–90% of a polydiorganosiloxane,
5–85% of a polyalkylene oxide or polyalkylene oxide derivative, and
5–85% of a vinyl monomer, thereby to form vinyl polymer bridges linking the polydiorganosiloxane and polyalkylene oxide or derivative thereof. The polymer is then blended with water and an emulsifying and/or dispersing auxiliary and subjected to high shear to form a defoaming agent.

3 Claims, No Drawings

FORMULATIONS OF DEFOAMING AGENTS CONTAINING POLYSILOXANES AND POLYETHERS

The invention relates to formulations of defoaming agents for aqueous systems which tend to foam, in particular to defoaming agents and anti-foam agents which, even in small amounts, prevent or reduce undesired foam formation.

Most textile-finishing processes take place at the textile fiber/aqueous liquor boundary. It is thus clear that textile auxiliaries are surface-active substances which develop their action at phase boundaries.

Foam formation is a side-effect of the surface-active textile auxiliaries which is undesired in practice in textile finishing, and a property which is only of restricted value even in the washing process. To combat this troublesome accompanying phenomenon, it is necessary to add foam-destroying substances to the liquor.

A defoaming agent should be sparingly soluble in water, so that, even when present in small concentrations, they remain at the phase boundary; on the other hand, the aqueous emulsions prepared from the defoaming agent must possess adequate stability.

The stability of the emulsion is a determining factor for the activity. According to experience, very stable emulsions have only a small defoaming effect, while relatively unstable emulsified silicone defoaming agents produce excellent effects. The problems mentioned relate not only to procedures and processes in the textile industry, but also to very many other industrial processes, such as, for example, in the glue industry, in the paper industry, in the processing of plastics and in the petrochemical industry.

For many of the processes described, there is a large number of types of defoaming agents which are adapted to the specific problems, in particular also defoaming agents based on silicones.

However, in the vast majority of cases, the problem of the stability of the defoaming agent remains as a technical problem.

For this reason, repeated attempts have been made to render silicones more hydrophilic by chemical modification, and thereby to make it possible to prepare more stable emulsions therefrom.

Defoaming agents based on polyether-siloxane copolymers fulfil the requirement of improved stability of the emulsion. However, this advantage is associated with certain disadvantages.

The synthesis of copolymers of silicones with other organic polymers which impart water solubility also involves, as a rule, several synthesis steps, usually with the use of solvents and auxiliary bases which have to be separated off from the reaction mixture after the reaction is complete.

The formation of water-soluble or water-dispersible polymers is hence possible only by means of syntheses which are complicated and frequently associated with losses in yields.

As a rule, their activity is lower than that of pure polysiloxane defoaming agents, thereby further reducing the cost-efficiency.

The activity of polyether-siloxane defoaming agents is to a certain extent temperature-dependent, that is to say, the relative defoaming activity of these defoaming agents is lower at low temperatures than at relatively high temperatures.

It was therefore an object of the present invention to produce defoaming substances which do not possess the disadvantages described and which are obtainable via simple chemical synthesis steps.

The object according to the invention is achieved by forming novel graft copolymers by free-radical polymerization of mixtures of organopolysiloxanes, water-soluble polymers, such as, for example, polyalkylene oxides or polyalkylene oxide derivatives, and vinyl monomers, preferably vinyl acetate, which graft copolymers are characterized in that they contain graft polymers which comprise organopolysiloxane and the polyalkylene oxide or polyalkylene oxide derivative employed and are crosslinked via polymerized units of the vinyl monomers employed.

Depending on their composition, graft polymers prepared in this manner are soluble or dispersible in water: when they have a high silicone content, these polymers can be readily emulsified in water by adding relatively small amounts of emulsifier.

The invention thus relates to formulations of defoaming agents containing graft copolymer dispersions, which are characterized in that they contain polydiorganosiloxanes, polyalkylene oxides or polyalkylene oxide derivatives and units, which are polymerized in the presence of mixtures of these components, of vinyl monomers and organopolysiloxane and polyalkylene oxide or polyalkylene oxide derivative components which are linked via vinyl polymer bridges.

The invention furthermore relates to formulations, of defoaming agents, comprising approximately I. 5–75% by weight of water
II. 0.5–15% by weight of emulsifying auxiliaries and/or dispersing auxiliaries and
III. 94.5–10% by weight of graft copolymer dispersions containing
   1. 10–90% by weight of polydiorganosiloxane
   2. 5–85% by weight of polyalkylene oxide and/or polyalkylene oxide derivatives and
   3. 5–85% by weight of polymerized units of vinyl compounds, the sum of the components I to III and III 1 to III 3 always being 100%.

The invention furthermore relates to formulations, of defoaming agents, which contain graft copolymer dispersions comprising about:

I. 10–90% by weight proportions of polydiorganosiloxane
II. 5–85% by weight proportions of polyalkylene oxide and/or polyalkylene oxide derivatives
III. 5–85% by weight proportions of polymerized vinyl acetate units and
IV. 0–50% by weight of α,β-unsaturated mono- or dicarboxylic acids.

Preferably, the formulations according to the invention, of defoaming agents, contain graft copolymer dispersions comprising about I. 10–80% by weight proportions of organopolysiloxane
II. 10–60% by weight proportions of polyalkylene oxide and/or polyalkylene oxide derivatives and
III. 10–60% by weight of polymerized units of vinyl acetate, the sum of the components I–III always being 100%.

The graft copolymer dispersions are prepared by subjecting mixtures comprising about I. 8–90% by weight of organopolysiloxane
II. 4.999–85% by weight of polyalkylene oxide and/or polyalkylene oxide derivatives and III. 5-85% by weight of one or more vinyl monomers and IV. 0.001-2% by weight of one or more free-radical formers, the sum of components I to IV always being 100%, to a polymerization reaction at temperatures between about room temperature and 250° C.

The invention furthermore relates to a process for the preparation of formulations of defoaming agents, which is characterized in that about I. 5-75% by weight of water II. 0.5-15% by weight of emulsifying auxiliaries and/or dispersing auxiliaries and III. 95.5-10% by weight of a graft copolymer dispersion, the sum of the components always being 100%, are converted into an aqueous solution or emulsion at temperatures between about room temperature and 130° C., under the action of shearing forces.

The graft copolymer dispersions are prepared by bringing mixtures comprising one or more organopolysiloxanes, polyalkylene oxide or polyalkylene oxide derivatives and one or more vinyl monomers, preferably vinyl acetate, in the presence of free-radical formers, to a reaction temperature which initiates the polymerization. The polymerization can be carried out by a continuous or discontinuous process.

The organopolysiloxanes used are essentially linear, and may be represented by the following formulae:

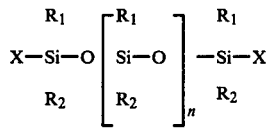

X = OH, CH = CH$_2$, CH$_3$,
R$_1$, R$_2$ = CH$_3$, C$_2$H$_5$, CH = CH$_2$,
n = 10 to 5,000

The organopolysiloxane components can contain, in addition to methyl groups, up to 50 mol-% of ethyl, vinyl or phenyl, but methyl-substituted organopolysiloxanes are preferably employed. Furthermore, hydroxyl-terminated organopolysiloxanes may also be used.

The polyalkylene oxides or polyalkylene oxide derivatives employed for the graft copolymerization as a rule possess hydroxyl groups, preferably from 1 to 8 hydroxyl groups, and are prepared, for example, by polymerization of epoxides, such as ethylene oxide, propylene oxide, butylene oxide or tetrahydrofuran, with itself, for example in the presence of polymerization catalysts, or by the addition reaction of these epoxides, if appropriate as a mixture or successively, with starter components containing reactive hydrogen atoms, such as water, alcohols, phenol or phenol derivatives, amines or amides. Ethylene oxide, or ethylene oxide and propylene oxide (as a mixture or successively), is preferably employed.

Examples of polyalkylene oxide derivatives are polyglycols which are prepared by polymerization of ethylene oxide with butanol or butylglycol as the starter molecule, and which have the general formula:

C$_4$H$_9$O[CH$_2$CH$_2$O]$_x$H or branched polyglycols formed by polymerization of ethylene oxide and propylene oxide, as a mixture or successively, started on trimethylolpropane, and having the formula:

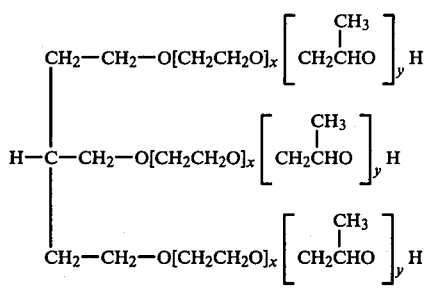

or linear derivative started on an alkylphenol, formed by polymerization of ethylene oxide and having the formula:

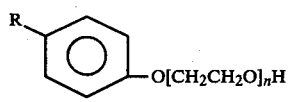

(R=n-alkyl or i-alkyl; N=1 to 100)

The following may be listed as examples of vinyl monomers:

Olefins, such as ethylene, propylene and isobutylene, vinyl esters of aliphatic or aromatic carboxylic acids, preferably vinyl acetate, vinyl propionate, α,β-unsaturated mono- or dicarboxylic acid and its derivatives, (meth)acrylic acid, methyl (meth)acrylate, ethyl (meth)acrylate, propyl or isopropyl (meth)acrylate, n-butyl, iso-butyl or tert.butyl (meth)acrylate, 2-ethylhexyl(meth)acrylate, (meth)acrylamide, N-alkyl-substituted (meth)acrylamide derivatives, (meth)acrylonitrile, maleic anhydride, maleic acid amide, N-alkyl-maleimide, maleic acid half esters or diesters, vinyl aromatics, such as styrene-alpha-methylstyrene, and 4-chloro-styrene, vinyl chloride, vinylidene chloride, vinylidene fluoride, tetrafluoroethylene, vinyl ethers, such as ethyl vinyl ether or n-butyl vinyl ether; the following may be listed from the series comprising the allyl compounds: allyl alcohol, allyl acetate, isobutene diacetate, 2-methylenepropane-1,3-diol, allyl ethyl carbonate and allyl phenyl carbonate. If crosslinking or an increase in the molecular weights of the vinyl resin phase is desired, divinyl compounds or diallyl compounds can be employed. Divinyl benzene, (meth)acrylates of polyhydric alcohols, such as, for example, ethylene glycol dimethacrylate and diethyleneglycol diacrylate, and divinyl ether may be mentioned. Vinyl acetate is preferably used.

The free-radical polymerization of the vinyl monomers can be started in a manner which is in itself known, with the aid of free-radical formers, UV radiation, or alpha-, beta- or gamma-radiation, or thermally, without further additives. The radiation-initiated polymerization is preferably carried out in the presence of sensitizers, see, for example, Jenkins, A. Ledwith, Reactivity, Mechanism and Structure in Polymer Chemistry, John Wiley & Son, London, New York, 1974, page 465.

To start the free-radical polymerization of the vinyl monomers, free-radical formers are employed in amounts from 0.001 to 2, preferably from 0.02 to 0.8, % by weight, relative to the total mixture comprising organopolysiloxane, polyester and vinyl monomers. Examples of free-radical formers which may be mentioned are azo initiators, such as azo-bis-isobutyronitrile (AIBN), azo esters, azo-imino esters or azo-N-alkylamides, peroxides, such as di-tert. butyl peroxide, dicumyl peroxide, or di-benzoyl peroxide, per-esters, such as amyl perpivalate tert.butyl perpivalate, tert. butyl peroctoate, t-butyl perbenzoate, or tert. butyl perneodecanoate, percarbonates, such as cyclohexyl percarbonate or biisopropyl percarbonate, or hydroperoxides, such as, for example, cumyl hydroperoxide or tert. butyl hydroperoxide.

Suitable initiators are furthermore benzopinacol and benzopinacol derivatives, or other thermally unstable, highly substituted ethane derivatives.

The polymerization can also be started, with the aid of redox systems, at lower temperatures than those corresponding to the thermal decomposition temperatures of the free-radical formers.

Examples of redox initiators which may be mentioned are combinations of peroxides and amines, such as, for example, benzoyl peroxide and triethylamine, trialkylboron bompounds and oxygen, hydroperoxides and sulphinic acids, formaldehyde or aldoses, or combinations containing low-valent transition metal salts and sulphur dioxide/peroxide redox systems.

The polymerization reaction can be carried out continuously or discontinuously, under atmospheric pressure or under reaction pressures up to, for example, 300 bar, preferably up to 15 bar, at reaction temperatures between $-20°$ C. and $+250°$ C., preferably from $70°$ to $190°$ C. If desired, the polymerization can also be carried out in the presence of solvents or diluents, water, alcohols, such as methanol, ethanol and tert.-butanol, aliphatic or aromatic hydrocarbons, halogenohydrocarbons, such as chlorobenzene or fluorinated compounds, ethers, such as dioxane or tetrahydrofuran, and sters, such as, for example, ethyl acetate, being mentioned, but the polymerization is preferably carried out in the absence of a solvent.

If desired, the polymerization reaction can be carried out in the presence of molecular-weight regulators. Mercaptans, such as n- or tert.-dodecylmercaptan, thioglycol, thioglycerol or thioacetates may be mentioned as regulators. Furthermore, sulphur-free molecular-weight regulators can be used, such as hydrocarbons; examples which may be mentioned are paraffin fractions, such as, for example, petroleum ether, light naphtha or cleaner's naphtha, alpha-olefins, such as, for example, propylene, isobutylene or but-1-ene, and ketones, such as, for example, acetone, methyl ethyl ketone or cyclohexanone and aldehydes, such as, for example, formaldehyde, acetaldehyde, propionaldehyde or isobutyraldehyde, or allyl compounds, such as, for example, allyl alcohol, allyl acetate, isobutene diacetate or allyl carbonates. Further suitable telogens are halogenohydrocarbons, such as methylene chloride, tetrachloroethane, dibromoethane, etc. As is to be expected, the viscosities of the dispersions can be controlled with the aid of regulators of this type.

The reaction of the monomers employed is determined by the polymerization process chosen and by the reaction conditions. In the discontinuous polymerization procedure, conversions which are as high as possible are desirable, so that at least 80% of the monomers employed, preferably more than 90%, are converted. The residual monomers are removed by distillation under atmospheric pressure or under reduced pressure, according to known processes. The residual monomer contents still effectively present in the dispersions after the working-up procedure are negligibly small, and are in general below 1,000 ppm, preferably below 100 ppm.

The graft copolymers according to the invention are stable and, depending on the composition, moderately viscous to highly viscous, white liquids.

Depending on their content of the silicone component, the graft polymers according to the invention are emulsifiable in water without additional auxiliaries, or can be converted into aqueous emulsions by simple measures, with the aid of emulsifiers.

To increase the defoaming activity, silicon dioxide having a BET surface of from 50 to 400 $m^2/g$ is added to the graft copolymer. In general, from 0.5 to 15% by weight, relative to the graft copolymer, of the silicon dioxide can be present. An amount of silicon dioxide of from 5 to 10% by weight, based on the graft copolymer, is preferred. Silicon dioxide of this type may be any precipitated product or product prepared in the gas phase, such as are generally known and obtainable commercially.

The defoaming agent is advantageously prepared by combining the abovementioned silicon dioxide with the graft copolymer, by subjecting the mixture of the two components to the action of high shearing forces. During this procedure, after stirring for some time, the temperature of the mixture is preferably increased to $100°$ to $150°$ C. for 1 to 3 hours in order to facilitate dispersion of the silicon dioxide in the graft copolymer. The mixture obtained can be passed through a homogenizer in order to reduce the particle size of the silicon dioxide filler dispersed in the graft copolymer, and to assist dispersion of the filler in the polymer liquid.

After the silicon dioxide has been mixed in in the course of, preferably, from 2 to 6 hours at the abovementioned temperatures, the mixture is cooled to room temperature while stirring, and can be employed as a foam-inhibiting agent.

However, it is also possible to prepare the agent in the form of an emulsion, in particular in the form of an oil-in-water emulsion. The use of such emulsions permits easier dispersion of the foam-inhibiting agent of the present invention in aqueous foam systems.

Emulsifying agents which can be employed are emulsifying agents which can be used in the foamed system to which the foam-inhibiting agent is to be added. Such emulsifying agents are conventional emulsifying agents, such as polyoxyethylene sorbitan monostearate, sorbitan monostearate and polyoxyethylene stearate, as well as mixtures thereof. If the foam-inhibiting agent comes into contact with foodstuffs, a mixture of sorbitan monostearate and polyoxyethylene stearate is preferred as the emulsifying agent. However, it is also possible to add other customary ingredients in order to emulsify the foam-inhibiting agent according to the present invention. Thus, for example, sorbic acid can be added, in a concentration of from 0.01 to 0.1% by weight of the composition, as a bactericide.

In the preparation of the emulsion, and as disclosed in U.S. Pat. No. 4,005,044, the emulsifying agent is preferably dissolved in water, the diorganopolysiloxane, together with the silicone resin, is dispersed in the solution of the emulsifying agent in water, a silazane-treated silicon dioxide filler is then mixed into the dispersion and the mixture obtained is milled. Although a procedure of this type is preferred since it accelerates dispersion of the filler, with rapid formation of a stable emulsion, the present invention is not restricted to such a mixing process. The stated process according to U.S. Pat. No. 4,005,044 is simply given as the preferred process for the preparation of the emulsion.

A general process for the preparation of the emulsion comprises adding the emulsifying agent, such as sorbitan monostearate and oxyethylene stearate, to water, and heating the mixture to temperatures of 60° to 100° C., while stirring under the action of strong shearing force. The desired amount of the foam-inhibitng agent according to the invention can then be added to this mixture, the foam-inhibiting agent having been obtained by incorporating the silicon dioxide filler into the graft copolymer according to the invention while stirring with high heavy action.

After the foam-inhibiting agent has been added at a temperature of from 40° to 100° C., mixing is continued for a period of from 1 to 5 hours, until the mixture is homogeneous. Further water can then be added in order to dilute the emulsion to the desired degree, during which heating is continued at a temperature of from 40° to 100° C., and stirring is continued under the action of strong shearing force. The total mixture is then cooled somewhat, and is treated for a period of from 1 to 4 hours in a colloid mill, until the emulsion is homogeneous. In this manner, a stable emulsion is obtained, and this can be employed as a foam-inhibiting agent having a good dispersibility. This process, which is used in the examples, is given here only as an example. Regardless of the process employed, it should be adapted to the particular requirements of the specific use.

In general, the constituents may be mixed using any process with which a sufficiently stable emulsion is obtained in a short time.

With regard to the emulsion formed, it should be pointed out that in the case of too stable an emulsion, difficulties will arise in the dispersion of the emulsion in the foamed system, resulting in the emulsion being less effective. If, on the other hand, the emulsion is too unstable, it is stable to storage for only a short time. Emulsions which are stable to storage for from 6 months to one year are preferred.

The examples given below are intended to illustrate the invention, without restricting it it any respect.

Preparation of the starting substances: The polydiorganosiloxanes are prepared in a manner which is in itself known (see W. Noll, "Chemie und Technologie der Silicone" (Chemistry and Technology of the Silicones), Verlag Chemie, Weinheim/Bergstrasse, 2nd edition, 1968, chapter 5, pages 162 et seq.).

The siloxanes mentioned in the examples are characterized as follows:

| Polysiloxane | Description | Viscosity mPa.s 25° C. |
| --- | --- | --- |
| 1 | trimethylsilyl-terminated | 1000 |
| 2 | hydroxyl-terminated | 10000 |

The polyalkylene oxide derivatives mentioned in the examples have the following parameters:

| Polyalkylene oxide | Composition | Physical parameters |
| --- | --- | --- |
| A | polyethylene glycol | m.p.; 58–60° C. molecular weight approx. 1500 |
| B | sorbitan trioleate | |
| C | oleyl alcohol- | |

-continued

| Polyalkylene oxide | Composition | Physical parameters |
| --- | --- | --- |
| D | 20-ethoxylate oleyl alcohol-50-ethoxylate | |

EXAMPLE 1 AND 2

1,000 g of polyalkylene oxide A and 1,600 g of polysiloxane No. 2 are initially introduced, under nitrogen, into a 6 l stirred vessel. The mixture is heated to 110° C., while stirring, and the following solution is then added in the course of 2 hours, at an internal temperature of 110° C.:

| Solution Example No. | Vinyl acetate | Polysiloxane No. 2 | tert. butyl perpivalate | Diethyl azo-diisobutyrate |
| --- | --- | --- | --- | --- |
| 1 | 1000 | 400 | 4.5 | — |
| 2 | 1000 | — | — | 6.0 |

The mixture is then stirred for 1 further hour at 110° C., and the volatile constituents are then distilled off in vacuo. The vinyl acetate conversion is 94.5% in Example 1 and 92.8% in Example 2. After having been cooled to room temperature, the products are solid.

EXAMPLE 3

1,000 g of polyalkylene oxide A and 1,600 g of polysiloxane No. 1 are heated to 110° C. under nitrogen, in a 6 l stirred vessel. A solution of 1,000 g of vinyl acetate, 400 g of polysiloxane No. 1 and 4.5 g of tert. butyl perpivalate is then added in the course of 2 hours, while the internal temperature is kept constant at 110° C. The mixture is then stirred for 1 further hour at 110° C., and the volatile constituents are then stripped off in vacuo. The vinyl acetate conversion is 92.1%. After having been cooled to room temperature, the dispersion has a viscosity of 8,000 mPa.s.

EXAMPLE 4

450 g of polysiloxane No. 1 and 225 g each of polyalkylene oxide B and C are heated to 110° C. under nitrogen, in a 2 l stirred vessel. A solution of 300 g of vinyl acetate, 150 g of polysiloxane No. 1 and 1.7 g of tert. butyl perpivalate is then added in the course of 2 hours, at an internal temperature of 110° C. The mixture is then stirred for 1 further hour and the volatile constituents are stripped off in vacuo. The vinyl acetate conversion is 91% and the viscosity of the dispersion which has been cooled to room temperature is measured as 46,500 mPa.s.

EXAMPLE 5

300 g of polysiloxane No. 2 and 300 g of polyalkylene oxide D are heated to 110° C. under nitrogen, in a 2 l stirred vessel. A solution of 200 g of vinyl acetate, 100 g of polysiloxane 2 and 1.2 g of tert. butyl perpivalate is then added in the course of 2 hours, and the mixture is stirred for a further 2 hours at 110° C. The volatile constituents are distilled off in vacuo. The vinyl acetate conversion is 93.6%. The reaction product is solid at room temperature.

EXAMPLE 6

11,880 g of polydimethylsiloxane (polysiloxane A) and 6,000 g of polyethylene oxide (molecular weight 6000) are initially introduced into a 40 l stirred vessel. The vessel is evacuated and flushed with nitrogen. The mixture is then heated to 110° C., and a solution of 9,240 g of vinyl acetate and 67.5 g of tert.-butyl perpivalate is added in the course of 3 hours. After the mixture has been stirred for a further 2 hours at 110° C., the volatile constituents are removed by distillation. The product has a viscosity of 22 Pas at 25° C., and contains 32.4% of polymerized units of vinyl acetate, 22.7% of units of polyethylene oxide and a 44.9% proportion of polysiloxane.

EXAMPLE 7

1.88 kg of a graft copolymer of Example 6, having a viscosity of 22 Pas, and 0.12 kg of silicon dioxide, which has been produced pyrogenically in the gas phase and rendered hydrophobic, and has a BET surface of 200 $m^2/g$, are mixed together for 30 minutes in a mixer-stirrer. A soft paste is obtained, which shows no change even after storage for more than 4 weeks.

EXAMPLE 8

1.8 kg of a graft copolymer of Example 3, having a viscosity of 8,000 mPa.s, and 0.2 kg of a precipitated silicic acid, which has been rendered hydrophobic and has a BET surface of 120 $m^2/kg$, are milled together for 2 hours in a barrel mill of 4 l capacity, and the mixture is then heated to 120° C., a vacuum of 53 mbar being applied. After the mixture has been cooled to room temperature, a liquid is obtained which shows no change even after storage for more than 4 weeks.

EXAMPLE 9

2 kg of a sorbitan trioleate are added to 35.0 kg of a formulation of a defoaming agent according to Example 7, and are mixed in. 63.0 kg of deionized water are then added in portions in the course of 30 minutes, while stirring, and the emulsion obtained in stirred for 1 further hour after the addition of the water. The emulsion is then homogenized once under a pressure of 200 bar, using a high-pressure homogenizing machine. A white emulsion of low viscosity is obtained.

EXAMPLE 10

1 kg of a sorbitan trioleate and 1 kg of an oleyl 50-ethoxylate are added to 40.0 kg of a formulation of a defoaming agent according to Example 8. The mixture is heated to 70° C., while stirring, and 58.0 kg of deionized water at room temperature are then added in the course of 45 minutes, while stirring. The emulsion obtained is stirred for a further hour after the addition of the water, and is then homogenized under a pressure of 200 bar, in one operation, using a high-pressure homogenizing machine. An emulsion of moderate viscosity is obtained.

EXAMPLE 11

(comparative experiments)

For purposes of comparison, an emulsion of a defoaming agent according to the prior art is prepared as follows: A defoaming compound is prepared by intensively mixing 92% by weight of a polydimethylsiloxane, having a viscosity of 1400 mPa.s at 25° C., and 6% by weight of a silicon dioxide, which has been produced by flame hydrolysis and has a surface of 380 $m^2/g$, and 2% by weight of a short-chain hydroxyl-terminated dimethylpolysiloxane. 35% by weight of the defoaming compound are initially introduced into a flask, and heated to 80° C. 4.5% by weight of an oleyl alcohol, which has been reacted with 20 mols of ethylene oxide, and 5.5% by weight of a p-iso-nonylphenol, which has been reacted with 6 mols of ethylene oxide, are added. 55% bu weight of water are added to this mixture in the course of 60 minutes, and stirring is continued for a further 15 minutes. Finally, the emulsion obtained is homogenized twice, under 200 bar, using a high-pressure homogenizing machine.

EXAMPLE 12

(comparative experiment)

This example shows the difference in properties of a simple mixture, but the same percentage composition as in Example 6, of the constituents present in the graft copolymer. For this purpose, 449 g of polysiloxane A, 227 g of polyethylene oxide (molecular weight 6000) and 324 g of polyvinyl acetate (molecular weight approx. 2200) are mixed, and the mixture is heated to 120° C. in the course of 2 hours, while stirring. After the mixture has been cooled, it was mixed, according to Example 7, with a silicon dioxide which had been rendered hydrophobic, and the mixture obtained was then converted, according to Example 9, into an aqeuous emulsion.

The formulations of defoaming agents as described above may be tested in the following manner.

FOAM-INHIBITING ACTION

The foam-inhibiting action of the formulations of defoaming agents may be tested in the following manner: A solution of a commercial alkyl sulphonate surface-active agent, containing 5 g/l of alkyl sulphonate, is prepared. 0.1 ml of a 10% strength by weight dilution of defoaming agent (0.00288 g of silicone/100 ml of alkyl sulphonate solution) or 0.5 and 0.25 ml of a 1% strength by weight dilution of defoaming agent (0.0014 g or 0.00072 g of silicone/100 ml of alkyl sulphonate solution) are pipetted into a commercial graduated foam-measuring vessel (according to Schlachter-Dirkes), and the volume is made up with 100 ml of alkylsulphonate solution containing 5 g/l of alkylsulphonate. In the course of 35 seconds, the solution introduced is beaten to 50 ml with a pneumatically operated beating apparatus. The stamp of the beating apparatus, which stamp is screwed onto a metal rod of 12 mm diameter, consists of silicone rubber having a diameter of 42 mm and a thickness of 3 mm. 10 holes of 5 mm diameter are located at equal distances.

The height of the foam immediately after the end of the beating time, and the time in which the foam disintegrates and reaches the 100 ml mark (height of the liquid level), are evaluated. The values obtained are compared.

DILUTABILITY WITH WATER

The dilutability, with water, of the formulations of defoaming agents is tested by preparing a 10% strength by weight aqueous dilution of the formulations of defoaming agents. Water and the defoaming agent are stirred for a short time in a beaker. A finely divided emulsion must form, which does not show any fatty, lumpy deposits after standing for 20 minutes. Any creaming which occurs should be capable of redistribution by shaking.

The results of the test are reproduced in Table 1:

TABLE 1

Foam-inhibiting action and dilutability with water

| Example | Dilutability with water | Defoaming action Height of foam (ml)/foam disintegration time (s) | | |
|---|---|---|---|---|
| | | 0.003 g | 0.0015 g | 0.001 g |
| 9 | good, no deposits | 60/3 | 100/9 | 200/40 |
| 10 | good, no deposits | 50/3 | 100/15 | 100/45 |
| 11 | poorer than in the case of 9 and 10, fine particles are deposited | 60/5 | 100/35 | 200/100 |
| 12 | very poor, extensive deposition of fatty agglomerates | No measurement possible, owing to formation of lumps | | |

It will be appreciated that the instant specification and examples are set forth by way of illustration and not limitation, and that various modifications and changes may be made without departing from the spirit and scope of the present invention.

We claim:

1. A defoaming composition comprising by weight approximately
   5–75% of water
   0.5–15% of an emulsifying and/or dispersing auxiliary and,
   94.5 to 10% of a polymer produced by polymerizing in the presence of a free-radical-forming catalyst a composition comprising by weight approximately
   10–90% of a polydiorganosiloxane,
   5–85% of a polyalkylene oxide or polyalkylene oxide derivative, and
   5–85% of a vinyl monomer, thereby to form vinyl polymer bridges linking the polydiorganosiloxane and polyalkylene oxide or derivative thereof.

2. A composition according to claim 1, further containing about 0.5 to 15% by weight of the polymer of silicon dioxide having a BET surface of from 50 to 400 $m^2/g$.

3. In the defoaming of a solution wherein a defoaming agent is added to the solution and the solution plus defoaming agent is mixed, the improvement which comprises employing as said defoaming agent a defoaming composition according to claim 1.

* * * * *